June 16, 1931.                W. H. NOBLE                1,810,783
                     STEERING WALKING CULTIVATOR
                  Filed Dec. 12, 1929    2 Sheets-Sheet 1

Inventor
W. H. Noble
By Watson E. Coleman
Attorney

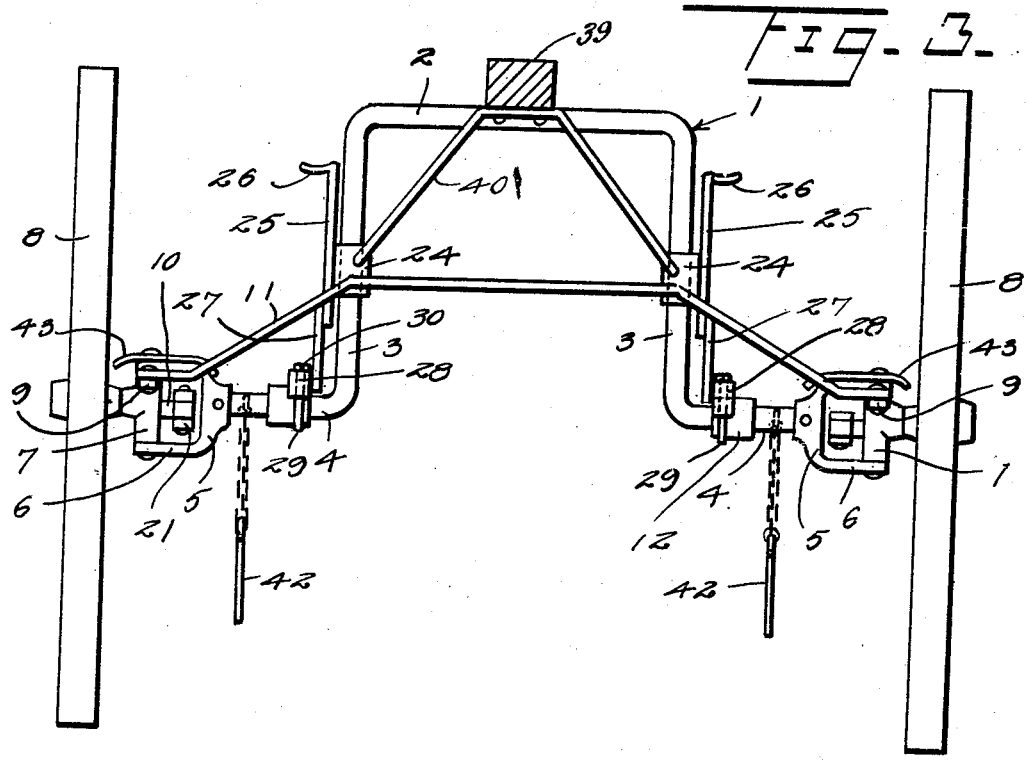

Patented June 16, 1931

1,810,783

UNITED STATES PATENT OFFICE

WILLIAM H. NOBLE, OF LEPANTO, ARKANSAS, ASSIGNOR OF FORTY-NINE PER CENT TO A. E. NOBLE, OF LEPANTO, ARKANSAS

STEERING WALKING CULTIVATOR

Application filed December 12, 1929. Serial No. 413,663.

This invention relates to improvements in steering walking cultivators.

The primary object of the present invention is to provide an improved means for steering a walking cultivator by pivotally mounting the plow beams and coupling the same by connecting links with the pivotally mounted wheels of the machine.

Another object of the invention is to provide an improved means for maintaining the plow beams of a walking cultivator in raised position.

Another object of the invention is to provide means whereby the pivotal connection between the supporting wheels for a walking cultivator and the axle attached thereto may be made rigid so that the wheels and axle will constitute a substantially integral structure.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 3 is a sectional view taken on the line 3—3 of Figure 2.

Figure 4 is a sectional view through one of the steering knuckle forks.

Figure 5 is a sectional view taken transversely of the axle and one of the plow beam collars thereon showing the connection between the collar and the beam lifting mechanism.

Figure 6 is a view similar to Figure 5 showing a modified form of the connection shown in Figure 5.

Figure 1:
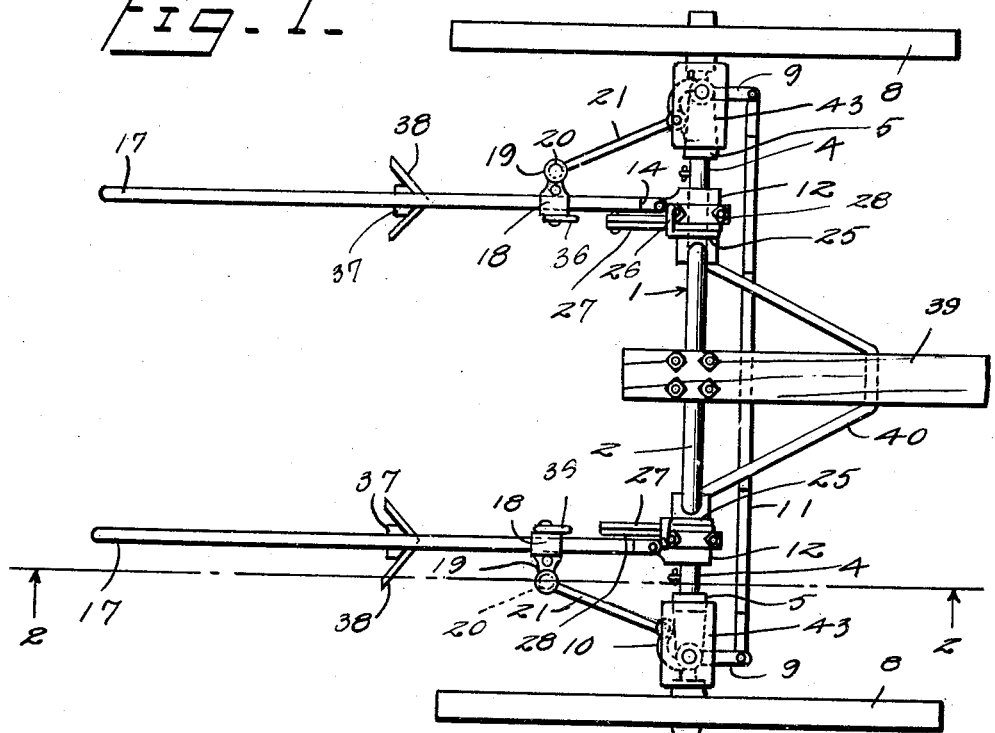
Figure 1 is a view in top plan of the cultivator constructed in accordance with the present invention.
Figure 2:
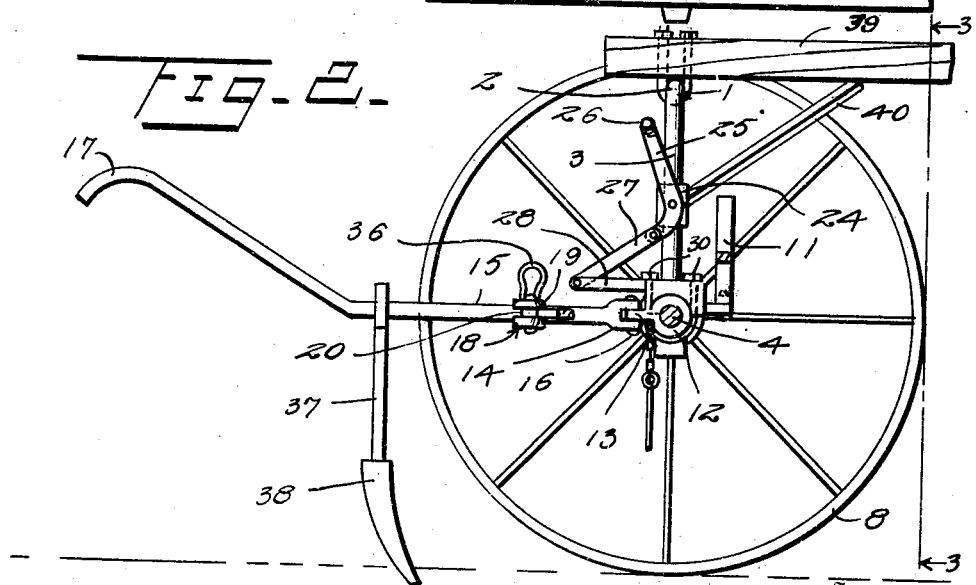
Figure 2 is a sectional view taken on the line 2—2 of Figure 1.

Referring more particularly to the drawings wherein like numerals of reference indicate corresponding parts throughout the several views, the numeral 1 indicates generally the axle of the present cultivator structure which axle is of the usual inverted U type comprising the upper yoke portion 2, the depending legs 3 and the laterally directed terminal portions 4.

To each of the terminal portions 4 of the axle a fork casting 5 is secured, the arms 6 of which are directed outwardly from the adjacent end portions and substantially parallel thereto as shown. Between the arms 6 of each of the castings 5 a stub axle knuckle 7 is pivotally mounted in the usual manner, upon which a wheel 8 is carried.

Each of the knuckles 7 has an arm 9 extending forwardly therefrom and each further has a rearwardly extending hooked arm 10. The arms 9 are connected by the cross rod 11 so that positive actuation of the wheels 8 in unison is assured. Oscillatably mounted upon each of the horizontal portions 4 of the axle is a collar 12 which has a tongue 13 projecting therefrom which is received in the bifurcated forward end portion 14 of a plow beam 15, a pin 16 connecting the furcations of the portion 14 with the tongue 13, which pin is vertically arranged so that lateral swinging movement of the beam may be effected. The rear portion of each beam 15 is extended at an upward inclination and terminates in the hand grips 17 by which an attendant may control the movement of the beam during the use of the machine.

Secured about each of the plow beams 15 at a point slightly removed from the pivot 16 thereof is a collar 18 which carries the laterally projecting socket elements 19 which are designed to be drawn together to engage about the ball end 20 on one end of a steering link 21. The other end of each steering link is formed to provide the fork 22 between the ends of which the apertured hooked extension carried by the adjacent knuckle 7 positions, a pin 23 coupling the extensions 10 with their respective links 21 as shown.

Secured about each of the upright portions 3 of the axle is a collar 24 upon which is pivotally mounted the bell crank member 25, one arm of which normally extends upwardly and terminates in a lateral hook 26 while the other arm has pivotally attached thereto one end of a link 27. The other end of each of the links 27 has pivotal connection with a rearwardly directed arm 28 which is secured in any appropriate manner to the adjacent collar 12.

One means of securing the arms 28 to their respective collars as shown in the structure is by recessing one side of the arm to receive the collar and then employing a U-bolt 29 to engage about the collar and extend the ends thereof upwardly through the arm for the reception of holding nuts 30.

In Figure 6 there is shown another method for connecting the arm 28 which consists in forming one end of the arm to provide a substantially semi-circular collar 31 having diametrically oppositely positioned ears 32 against which a similar collar 33 positions having ears 34 for connection by bolts 35 with the ears 32.

Each of the collars 18 carried by the plow beams 15 has a loop 36 secured thereto and extending upwardly therefrom, which loops are designed to receive the hooks 26 of the bell cranks 25 when the plow beams are raised from the ground.

Each of the beams is designed to carry one or more depending bars 37 which in turn carries upon its lower end a plow shovel 38.

The draft tongue for the cultivator which is indicated by the numeral 39 may be attached in the usual manner to the central portion of the axle 1 as shown and brace bars 40 may be provided to maintain the tongue rigid with the axle.

The portions 6 of each of the forks 5 between which the steering knuckles 7 are mounted have formed therethrough apertures 41 and secured as with a chain or in some other manner to the adjacent part of the axle is a pin 42.

In the use of the cultivator embodying the present invention the attendant is able to steer or guide the same by applying lateral pressure to the handles 17 so as to swing the same and the plow beams 15 and oscillate the wheels 8 by the application of pressure to the hooked extensions 10 through the medium of the links 21. By this means the cultivator can be maintained on the correct path without making the draft animals swerve from the path of travel of the machine. If for any reason the steering feature of the cultivator is not wanted the pins 23 may be removed and the pins 42 inserted through the aligned apertures 41 in the portions 6 of the forks, running them through the apertured ends of the hooked extensions 10 thus locking the steering knuckles against movement.

When the plows are not in use the beams may be swung upwardly after disconnecting the links 21 and maintained in raised position by engaging the hooks 26 through the eyes 36 carried by the beams, the swinging of the bell crank member 25 down to meet the loops 36 at the same time acting to oscillate the attached collars 12 to which the plow beams are connected.

In order to protect the steering knuckles from dirt each of the forks 5 has secured thereover cover devices 43 which may be of leather or any other suitable material, these covers depending about the knuckles in the manner shown and acting to prevent dirt falling from the wheels getting between the moving parts of the mechanism.

From the foregoing description it will be appreciated that a cultivator constructed in accordance with the present invention may be much more easily handled and more easily maintained in the proper path than cultivators of the type wherein the steering thereof can only be effected by the guiding of the draft animals.

Having thus described my invention, what I claim is:—

1. A cultivator comprising an axle having a raised central portion, a fork carried at each end of the axle, a stub shaft carrying steering knuckle pivotally mounted in each of said forks, a wheel carried by the stub shaft of each knuckle, a plow beam pivotally attached to the axle adjacent each end thereof whereby both vertical and lateral swinging movement of the same may be accomplished, a link connection between each plow beam and an adjacent steering knuckle, a bell crank element pivotally mounted on the raised portion of the axle adjacent each plow beam and adapted when oscillated to effect the raising of the plow beam, and means for coupling an arm of each bell crank with the adjacent plow beam.

2. A cultivator comprising an axle having a raised central portion, a fork carried at each end of the axle, a stub shaft carying steering knuckle pivotally mounted in each of said forks, a wheel carried by the stub shaft of each knuckle, a plow beam pivotally attached to the axle adjacent each end thereof whereby both vertical and lateral swinging movement of the same may be accomplished, a link connection between each plow beam and an adjacent steering knuckle, a bell crank element pivotally mounted on the raised portion of the axle adjacent each plow beam and adapted when oscillated to effect the raising of the plow beam, a collar carried by each plow beam, and an element carried by each collar adapted to engage an arm of the adjacent bell crank when the plow beam is raised to maintain the beam in raised position.

3. A walking cultivator of the character described comprising an axle having an inverted U-shaped central portion, a steering fork at each end of the axle, a steering knuckle oscillatably mounted in each fork and carrying a stub axle and a laterally directed steering arm, a wheel carried by each stub axle, a pair of plow beams each attached to the first mentioned axle and adapted to be swung vertically thereon, each of said beams further being mounted to permit lateral swinging movement, a connecting link between each of said beams and the adjacent steering arm, said links being detachably coupled with their respective steering arms, and a securing pin mounted adjacent each steering arm and adapted to secure the arm to the adjacent fork upon disconnection of the adjacent link therefrom.

4. A walking cultivator of the character described comprising an axle having an inverted U-shaped central portion, a steering fork at each end of the axle, a steering knuckle oscillatably mounted in each fork and carrying a stub axle and a laterally directed steering arm, a wheel carried by each stub axle, a pair of plow beams each attached to the first mentioned axle and adapted to be swung vertically thereon, each of said beams further being mounted to permit lateral swinging movement, a connecting link between each of said beams and the adjacent steering arm, said links being detachably coupled with their respective steering arms, a securing pin mounted adjacent each steering arm and adapted to secure the arm to the adjacent fork upon disconnection of the adjacent link therefrom, a bell crank element mounted upon the first mentioned axle adjacent each plow beam, a link connection between one arm of each bell crank and the element coupling the adjacent plow beam to the axle whereby raising of the plow beam will be effected upon oscillation of the bell crank, and means for coupling the other arm of each bell crank with the adjacent plow beam when the same has been raised.

5. A cultivator of the character described, comprising an axle, wheels pivotally attached to said axle to swing about a vertical axis, a plow beam pivotally attached to said axle to swing vertically, a vertically oscillatable bell crank mounted in a plane above the plow beam, means connected with and actuated by said crank and connected with the plow beam whereby upon oscillation of the crank the plow beam will be raised from the ground, and means for coupling an arm of the bell crank with said plow beam for securing the latter in raised position.

6. A cultivator of the character described, comprising an axle, a wheel attached to each end of said axle, a draft beam connected with said axle, a sleeve oscillatably secured to said axle, a plow beam attached to said sleeve, a vertical arm carried by said sleeve, and oscillatable bell crank mounted in a plane above said sleeve, and a link connecting one arm of the crank with said arm whereby upon oscillation of the crank said sleeve will be oscillated on the axle to raise said plow beam.

7. A cultivator, comprising an axle, a wheel pivotally attached to each end of the axle to swing about a vertical axis, a pair of sleeves oscillatably mounted on said axle, an arm carried by each of said sleeves, a plow beam pivotally attached to each sleeve to swing transversely of the path of travel of the cultivator, means coupling each plow beam with a wheel whereby lateral swinging of the beam will cause oscillation of the wheel about said vertical axis, a vertically oscillatable bell crank mounted adjacent each beam in a plane above the axle, and means connecting an arm of each crank with the adjacent beam whereby upon disconnection of said first mentioned means and oscillation of the crank the adjacent plow beam may be raised.

In testimony whereof I hereunto affix my signature.

WILLIAM H. NOBLE.